(12) United States Patent
Lopes Praca

(10) Patent No.: US 7,464,443 B2
(45) Date of Patent: Dec. 16, 2008

(54) DEVICE FOR QUICK FASTENING AND TENSION ADJUSTMENT OF MULTIPLE CORD CONFIGURATIONS

(76) Inventor: Miguel Martinho Lopes Praca, 1119 San Anselmo Ave., San Anselmo, CA (US) 94941

( * ) Notice: Subject to any disclaimer, the term of this patent is extended or adjusted under 35 U.S.C. 154(b) by 132 days.

(21) Appl. No.: 11/209,381

(22) Filed: Aug. 22, 2005

(65) Prior Publication Data
US 2006/0054070 A1    Mar. 16, 2006

Related U.S. Application Data

(60) Provisional application No. 60/609,421, filed on Sep. 13, 2004.

(51) Int. Cl.
*B63B 21/04* (2006.01)
(52) U.S. Cl. ..................... 24/129 R; 114/218
(58) Field of Classification Search ............... 24/115 R, 24/129 R, 130; 114/218
See application file for complete search history.

(56) References Cited

U.S. PATENT DOCUMENTS

| | | | | | |
|---|---|---|---|---|---|
| 1,397,051 | A | * | 11/1921 | Hopkins | ............... 24/129 R |
| 3,126,858 | A | * | 3/1964 | Rosinki | ............... 114/218 |
| 5,477,800 | A | * | 12/1995 | Lawrence | ............... 114/218 |
| 6,763,776 | B1 | * | 7/2004 | Perri et al. | ............... 114/218 |

OTHER PUBLICATIONS

E-Z-TY, Shell Mold & Engineering, San Marcos, California, Date Unknown.

* cited by examiner

*Primary Examiner*—Jack W. Lavinder

(57) ABSTRACT

Free-standing anchoring devices are provided for use with lines such as cords and ropes. The anchoring devices include various combinations of clam and boat cleats in unitary parts. One exemplary embodiment includes a boat cleat, a clam cleat, and a post proximate to the clam cleat. Another includes two clam cleats between two posts. A variation of this embodiment adds a boat cleat to the underside of the part.

7 Claims, 8 Drawing Sheets

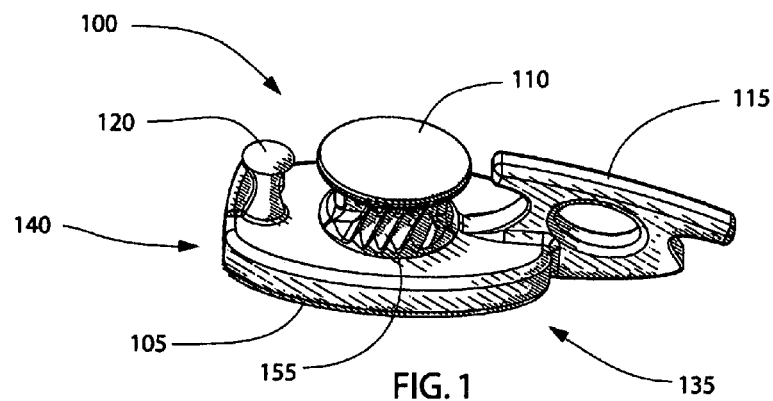
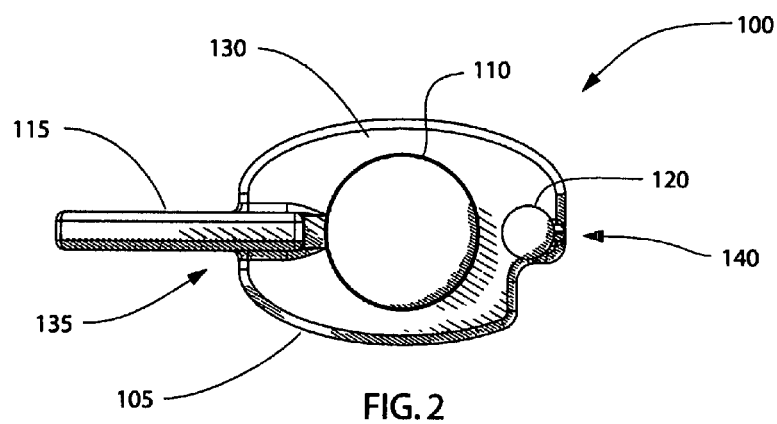
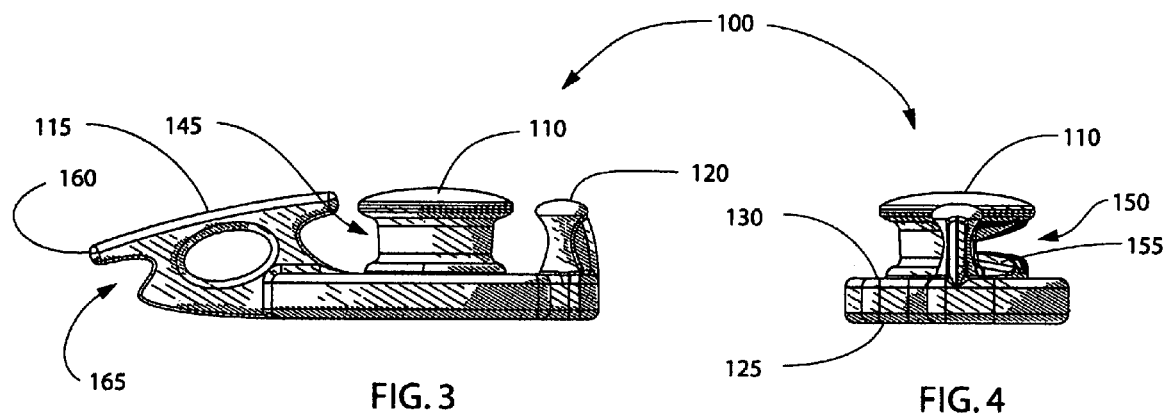

DEVICE FOR QUICK FASTENING AND TENSION ADJUSTMENT OF MULTIPLE CORD CONFIGURATIONS

This application claims the benefit of U.S. Provisional Application No. 60/609,421 filed Sep. 13, 2004 and titled "Device for Quick Fastening and Tension Adjustment of Multiple Cord Configurations" which is incorporated herein by reference.

BACKGROUND OF THE INVENTION

1. Field of the Invention

The present invention relates generally to fastening systems and more particularly to an anchoring device for securing a cord quickly and reliably without the use of knots.

2. Description of the Prior Art

A variety of fastening systems work well for specific applications. Flat belts, for example, employ a self-locking buckle that secures an end of the belt and easily engages and disengages therefrom. As tension is applied to the belt, the self-locking buckle grips the belt tighter. Such flat belt systems are generally limited in their range of application, however, and typically are part of a system comprised of a load bearing structure (e.g. a roof rack, the back of a pickup truck) and the flat belt fastening system (e.g. an adjustable belt for a kayak or surfboard carrier). Here, the flat belt fastening system engages the load bearing structure and attaches to itself.

Another common fastening system comprises bungee cords. Bungee cords are elastic cords having a hook at either end and are useful because they have a certain range of adjustment by stretching, they fasten easily by attaching the hooks to any suitable part of a load bearing structure or rack, and tension can be varied with the degree of stretching. Bungee cords are limited, however, in that they can only stretch so far, and the length adjustment is not independent of the tension adjustment.

The most universal alternative way to secure a load in place is with the use of a rope, line, or cord of generally round cross section, and the use of knots. Generally, a person skilled in the use of knots can secure just about any configuration of load to any configuration of structure or rack, at any number of attachment points, given a sufficient length of cord. However, not only is a special skill required, but it can be a slow and complicated process to fasten and unfasten the cord from the attachment points. Particularly, when a single long cord is employed, the process of fastening a load is executed in a laborious sequence, where the whole length of the free cord has to be passed through each of a number of feed-through points. The unfastening process is equally laborious. Further, when tension must be adjusted, the process is very slow and dependent on both the skill level of the person securing the load, and the forethought given to the task of designing the tie down configuration. The general lack of skill in securing loads with cords or ropes can be readily appreciated on any urban freeway.

Therefore, what is needed is an anchoring device that allows the use of a rope or cord as a fastening means for universal application, does not employ feed-through points, require a fastening sequence, or require the use of knots, and readily facilitates tension adjustment.

SUMMARY

An anchoring device according to an exemplary embodiment of the present invention comprises a base having a top surface and first and second ends, a boat cleat extending from the first end of the base, and a clam cleat disposed on the top surface of the base. The boat cleat is considered a permanent attachment point as a line can be secured thereto without the use of knots and will not release while under tension. The clam cleat is considered an adjustable attachment point as the nature of the clam cleat allows the line to be readily repositioned for increased or decreased tension. The anchoring device can further comprise a post disposed on the top surface proximate to the second end of the base to maintain an alignment of a line engaged with the clam cleat. In some embodiments an eyelet is also disposed on the post.

An anchoring device according to an exemplary embodiment of the present invention comprises a base having top and bottom surfaces and first and second ends, a first post disposed on the top surface proximate to the first end and a second post disposed on the top surface proximate to the second end, and two clam cleats disposed on the top surface of the base between the two posts. Because of the use of two clam cleats, these embodiments can also be used as a line ratchet. Further embodiments of this invention also comprise a boat cleat disposed on the bottom surface of the base.

BRIEF DESCRIPTION OF DRAWINGS

FIGS. 1-4 are perspective, top plan, front elevation, and side elevation views, respectively, of an anchoring device according to an exemplary embodiment of the present invention.

DETAILED DESCRIPTION OF THE INVENTION

Figure 5:
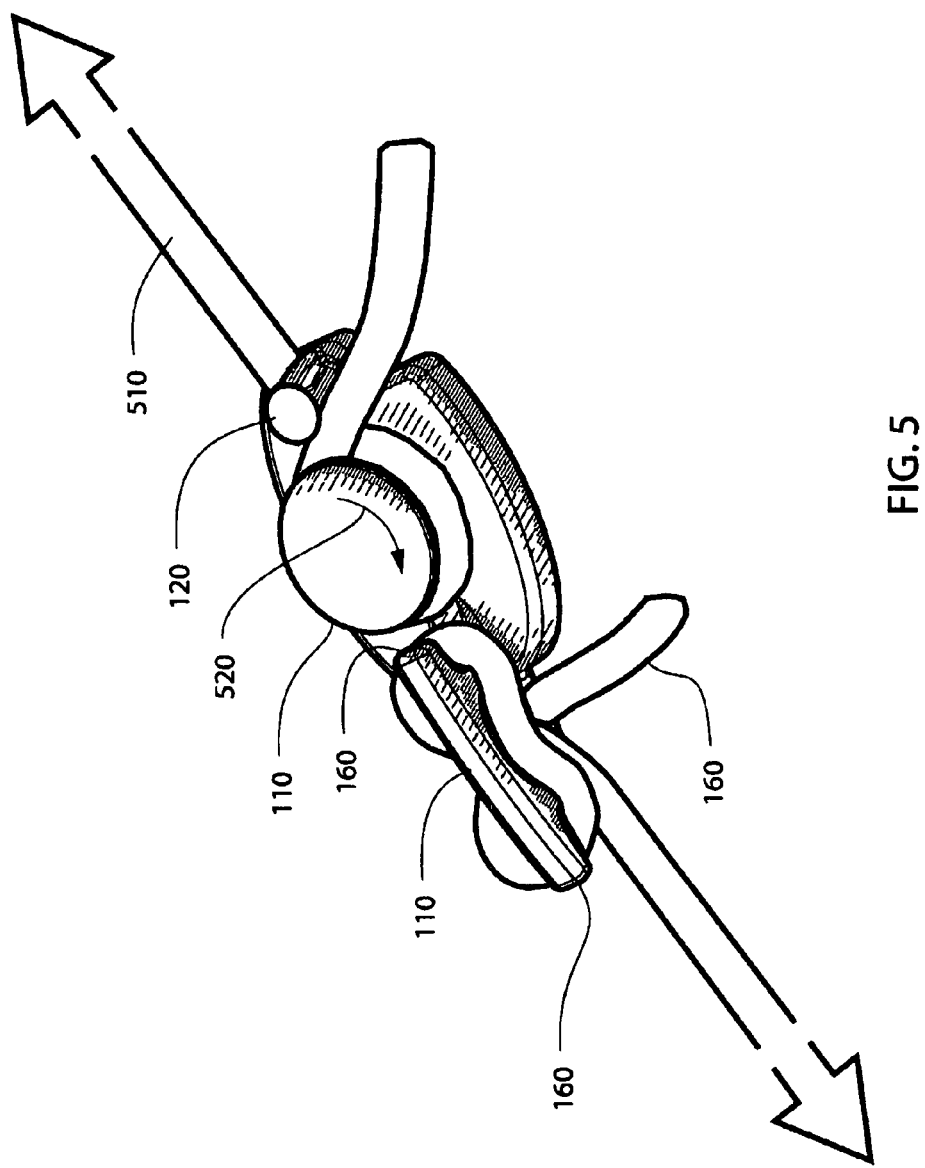
FIG. 5 is a perspective view of the anchoring device of FIGS. 1-4 engaging two lines according to an embodiment of the present invention.

The present invention provides anchoring devices for use with lines. As used herein, a line can be a cord, a rope, twine, string, or the like. The anchoring devices are free-standing, in that they do not need to be fixed to a generally immovable object like a tree, a pier, or the ground, though it will be appreciated that the anchoring devices of the invention can be so affixed. As free-standing devices, the anchoring devices of the invention are meant to anchor lines together while either dangling in free space, or while resting against a surface. The anchoring devices of the invention bring together two or more cleats in unitary parts with designs that provide for easy line engagement, easy tension adjustment, and fast release.

Although the anchoring devices may be used with knots, they are designed so that knots are not required for typical uses. Additionally, with the anchoring devices of the invention, lines can be configured in complex arrangements without having to feed the entire line through any attachment points or loops. The anchoring devices of the invention are useful for a wide range of activities and settings including boating, camping, climbing, trucking, industry, home, garage, and yard.

FIGS. 1-4 illustrate an exemplary anchoring device 100 according to an embodiment of the present invention. FIG. 1 shows a perspective view of the anchoring device 100, and FIGS. 2-4 show top plan, front elevation, and side elevation views, respectively. The anchoring device 100 is a free-standing structure comprising a base 105, a clam cleat 110, a boat cleat 115, and a post 120 that is a mushroom-shaped knob in some embodiments. The base 105 includes a bottom surface 125, a top surface 130, a first end 135, and a second end 140. The anchoring device 100 can be integrally formed from metal or plastic by casting or injection molding, for example. Alternately, the anchoring device 100 can be assembled by joining together constituent pieces.

The clam cleat 110 is disposed on the top surface 130 of the base 105 and is generally centered thereon. The clam cleat 110 comprises a groove 145 including a narrow portion 150 having opposing rows of teeth 155 disposed therein. The teeth 155 are oriented within the narrow portion 150 such that a line (not shown) disposed in the narrow portion 150 and pulled in a first direction will be gripped by the teeth 155. The teeth 155 readily release the line when the line is pulled in a second direction opposite to the first direction.

The boat cleat 115 projects from the first end 135 of the base 105. The boat cleat 115 comprises an elongated plate including a nose 160 and a recess 165 at either end and an aperture 170 defined through the middle. A line can be attached to the boat cleat 115 in numerous ways. For example, the line can be passed through the aperture 170 and tied with a knot. Advantageously, however, the line can also be attached without the use of a knot. For example, a loop of the line can be fed through the aperture 170 and hooked over one of the two noses 160. Alternately, after passing the loop through the aperture 170, the loop is passed back over the two noses 160 and pulled tight into the two recesses 165, as shown in FIG. 5.

When the line 500 is attached to the boat cleat 115 and another line 510 is attached to the clam cleat 110, and tension is applied to two the lines 500, 510, the two lines 500, 510 become collinear (in the absence of any additional force or moment applied to the anchoring device 100) and the anchoring device 100 aligns with the two lines. Since the clam cleat 110 is a directional device that will tighten if the line 510 is pulled in one direction and release if the line 510 is pulled in the opposite direction, it is important to insure that the line 510 is wrapped in the correct direction around the clam cleat 110 so that an applied tension tightens the line 510 into the clam cleat 110. A marking 520 on the clam cleat 110 can be useful to indicate the correct wrap direction. It is likewise important that the line 510, when secured by the clam cleat 110, cannot be pulled laterally out of the narrow portion 150 of the groove 145. The post 120 is provided to help the line 510 coming out of the clam cleat 110 maintain a consistent alignment, as can be seen from FIG. 5.

Figure 6:
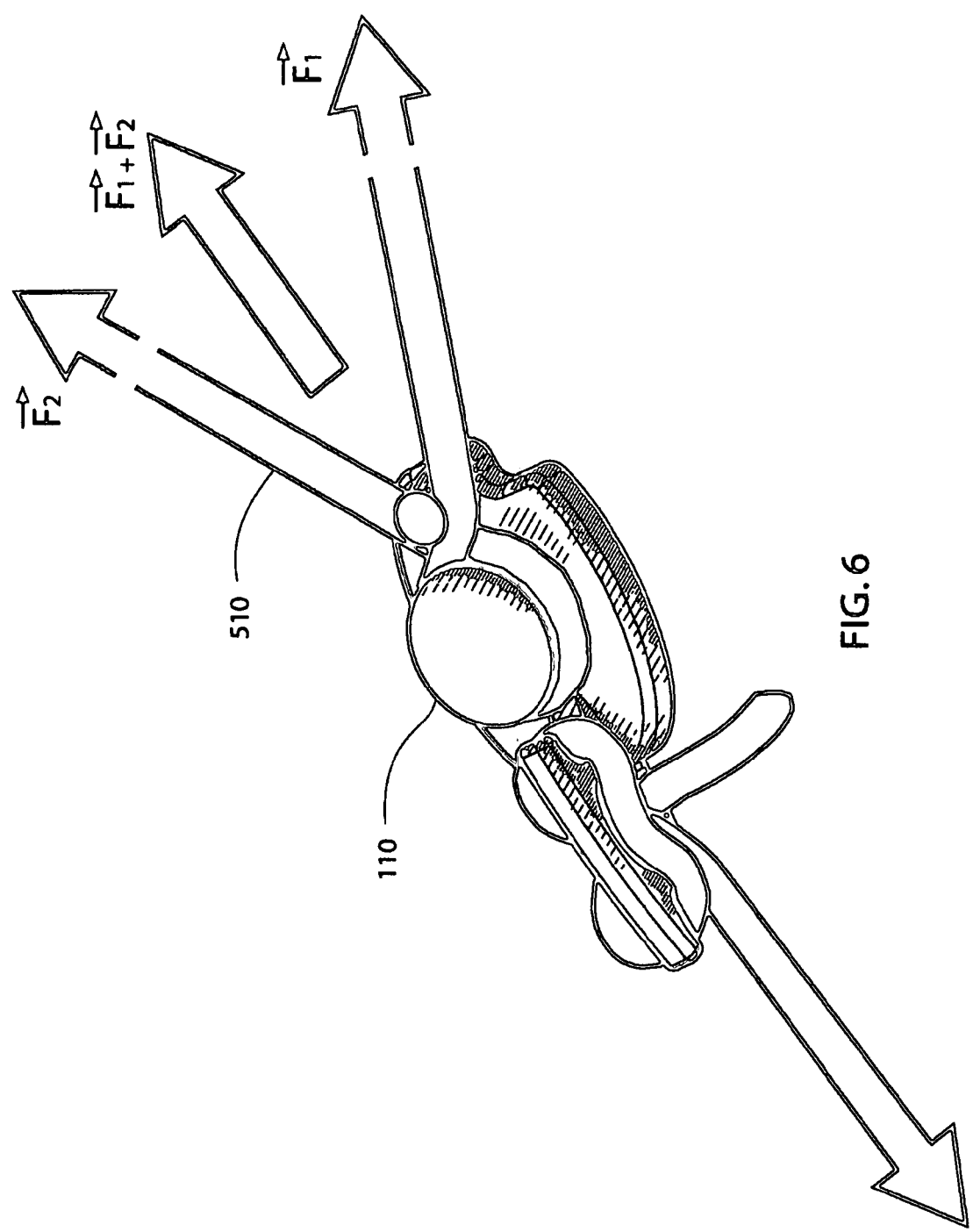
FIG. 6 is a perspective view of the anchoring device of FIGS. 1-4 engaging two lines according to another embodiment of the present invention.

FIG. 6 shows the anchoring device 100 used in a configuration where both ends of line 510 are tensioned. It will be appreciated that in this configuration the anchoring device 100 anchors three points in a plane rather than two points on a line as in the prior embodiment of FIG. 5. Here, the force acting on the clam cleat 110 due to line 510 is the sum of the two forces acting on the ends of the line 510, as illustrated.

Figure 7:
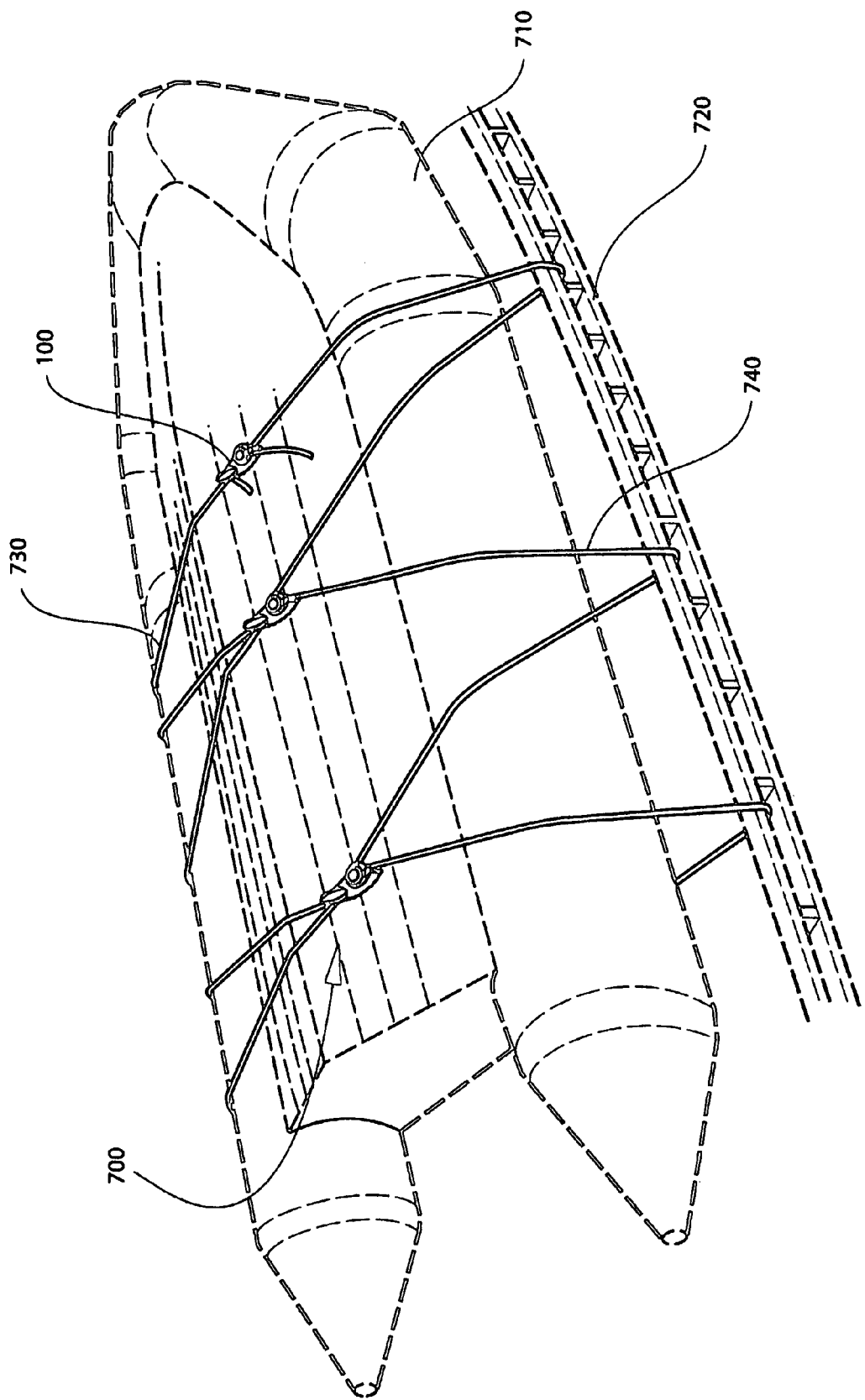
FIG. 7 is a perspective view of an anchoring system created from multiple anchoring devices according to an embodiment of the invention.

FIG. 7 illustrates an anchoring system 700 created from multiple anchoring devices 100, according to an embodiment of the invention. In FIG. 7, the anchoring system 700 is used to secure a large load 710, such as a dinghy, to a load-bearing rack 720. In anchoring system 700, the boat cleats 115 of each anchoring device 100 are permanently attached to a first line 730. A second line 740 alternately passes through anchor points on the rack 720 and the clam cleats 110 of the anchoring devices 100. It will be appreciated that the first and second lines 730 and 740 can be ends of the same line that passes underneath the object. It will be appreciated that anchoring systems of the invention, such as anchoring system 700, can be configured to cover large areas, such as a truck bed, by distributing a number of anchoring devices 100 in two rows on either side of the large area, and tying through the cleats 110, 115 in a zigzag pattern as shown in FIG. 7. Anchoring system 700 therefore allows loads of various sizes to be quickly secured with one long line.

Figure 8:
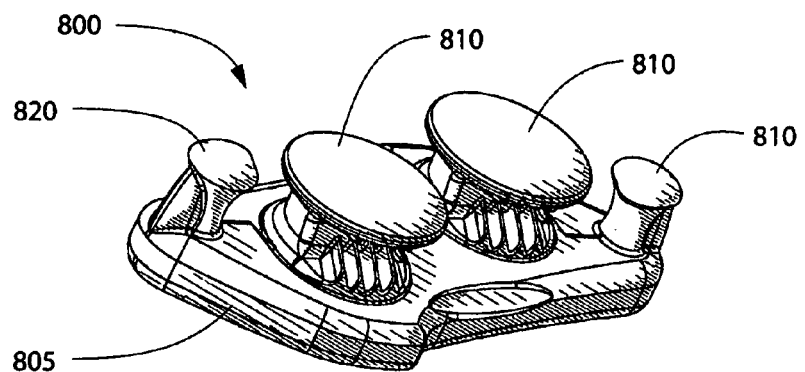
FIGS. 8-11 are perspective, top plan, front elevation, and side elevation views, respectively, of an anchoring device according to another exemplary embodiment of the present invention.
Figure 9:
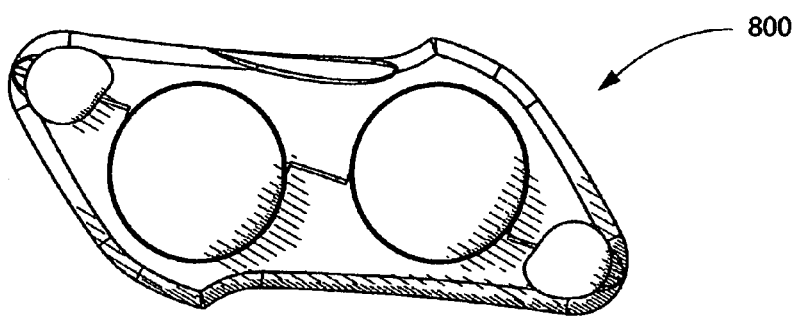
Figures 10, 11:
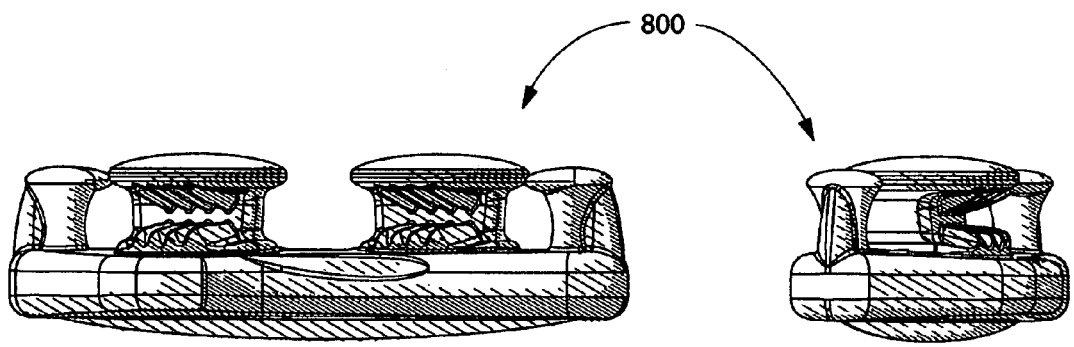

An anchoring device 800, according to another exemplary embodiment of the invention, includes two adjustable anchoring points, instead of a fixed anchoring point, for additional adjustability as shown in FIGS. 8-11. FIG. 8 shows a perspective view of the anchoring device 800, and FIGS. 9-11 show top plan, front elevation, and side elevation views, respectively. Particularly, anchoring device 800 comprises a base 805 having two clam cleats 810 disposed on a top surface thereof. The anchoring device 800 also includes two posts 820, one post 820 associated with each of the two clam cleats 810. The clam cleats 810 and posts 820 of anchoring device 800 are used much as the corresponding components of anchoring device 100 as described with respect to FIGS. 5 and 6. Because of the two clam cleats 810, the anchoring device 800 can also be used as a line grip. In this configuration the line is wrapped in a zigzag fashion past a first post 820, then around the clam cleat 810 nearest to the first post 820, then around the other clam cleat 810, and then past the other post 820. It will be understood that in this configuration the line only passes through the narrow portion 150 (FIG. (FIG. 4) of one of the two clam cleats 810. Hence, the anchoring device 800 becomes a line ratchet, able to slide with some resistance in one direction, and gripping the line when pulled in the other direction.

Figure 12:
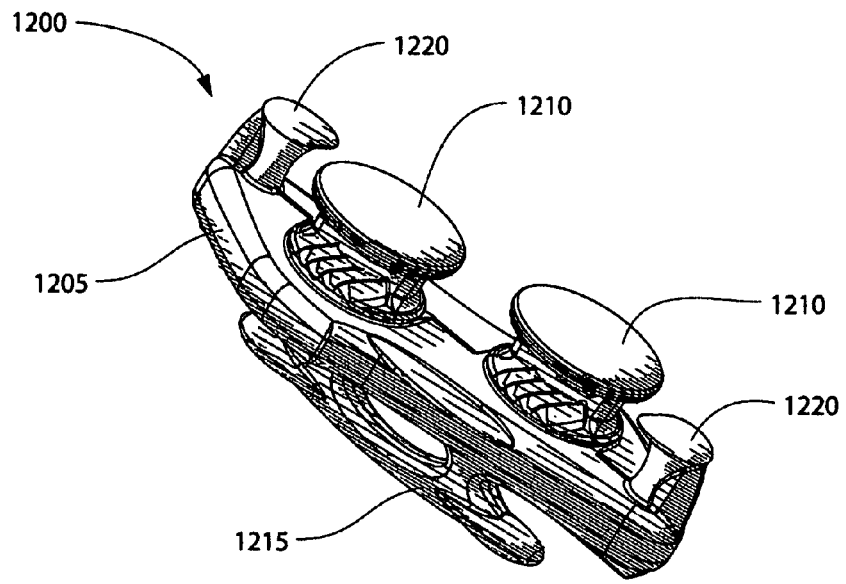
FIGS. 12-15 are perspective, top plan, front elevation, and side elevation views, respectively, of an anchoring device according to still another exemplary embodiment of the present invention.
Figure 13:
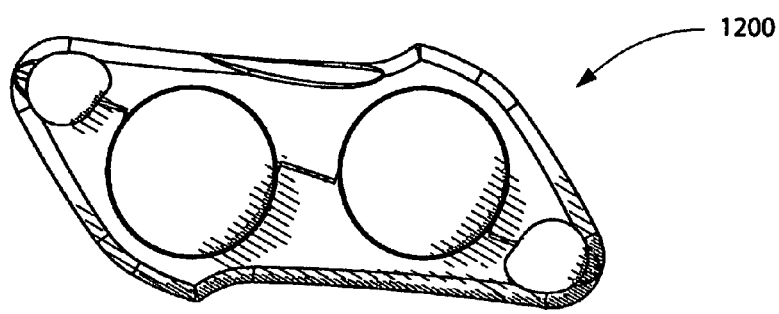
Figure 14:
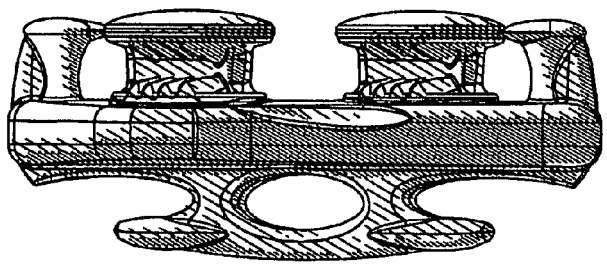
Figure 15:
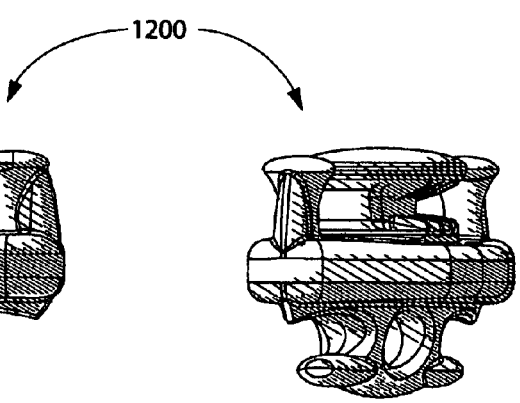

FIG. 12 shows a perspective view of yet another exemplary anchoring device 1200, and FIGS. 13-15 show top plan, front elevation, and side elevation views thereof, respectively. Anchoring device 1200 comprises a base 1205 having two clam cleats 1210 and two posts 1220 disposed on a top surface thereof. Anchoring device 1200 also comprises a boat cleat 1215 disposed on a bottom surface of the base 1205. Placing the boat cleat 1215 longitudinally on the bottom of the base 1205, though not required, advantageously adds rigidity to the anchoring device 1200. Additionally, this placement makes the boat cleat 1215 easy to mold since a parting line goes through the posts 1220 which are split between a cavity and the core of the mold.

Figure 16:
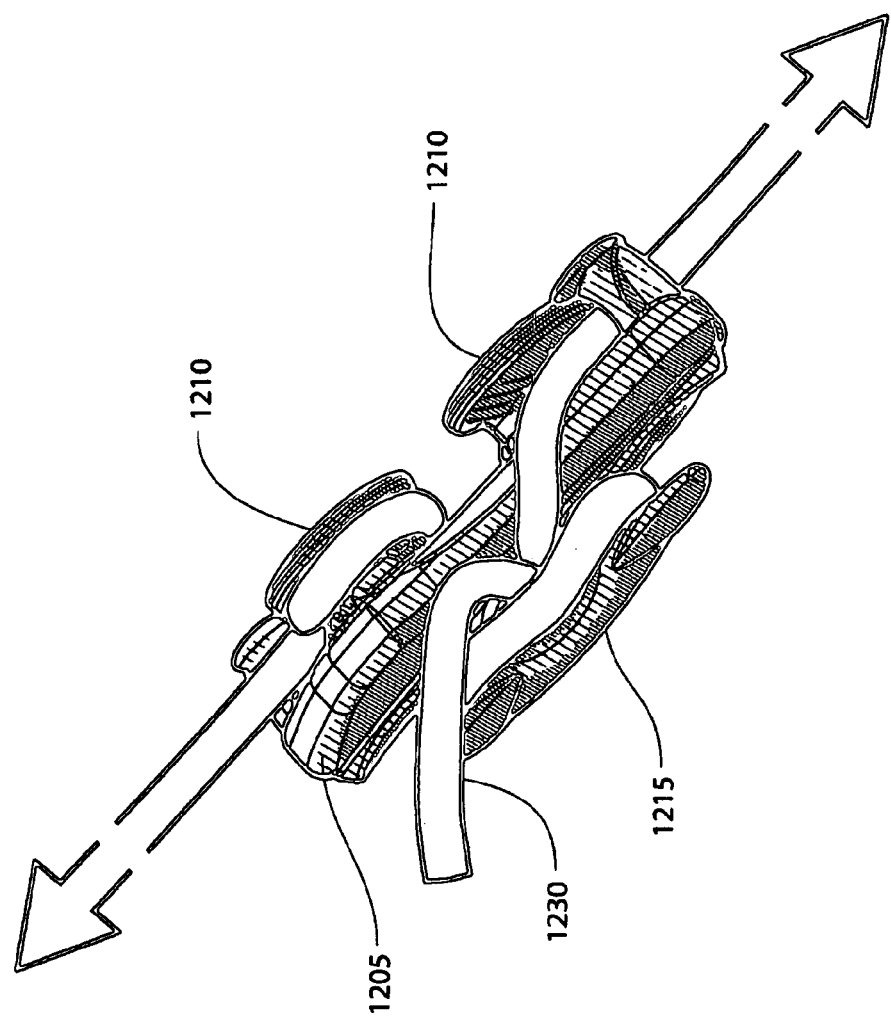
FIG. 16 is a perspective view of the anchoring device of FIGS. 12-15 engaging a line according to an embodiment of the present invention.

The clam cleats 1210 and posts 1220 function as described above with respect to FIGS. 8-11, including the use of the anchoring device 1200 as a line ratchet. As shown in FIG. 16, the boat cleat 1215 can be used to anchor a line 1230, which can be routed around the base 1205 in such a way that the line 1230 exits the anchoring device 1200 by wrapping at least partially around one of the posts 1220, keeping the line of force oriented through the posts 1220. The line 1230 additionally may wrap around one of the clam cleats 1210, but this is not required as the line 1230 is already secured. It will be appreciated that the boat cleat 1215 can also be used to apply tension to a line. In this capacity the anchoring device 1200 functions as a hand held line grip and there is no need to route the line around one of the posts 1220.

The boat cleat 1215 on the bottom of the anchoring device 1200 also provides the anchoring device 1200 with some utilities beyond joining lines together in tension. For example, where the anchoring device 1200 is used to join two lines in a substantially horizontal configuration, the boat cleat 1215 can be used to hang objects from a third line. Likewise, a rope ladder can be readily constructed from two parallel rows of anchoring devices 1200 where a non-tensioned line passes between boat cleats of facing anchoring devices 1200.

Figure 17:
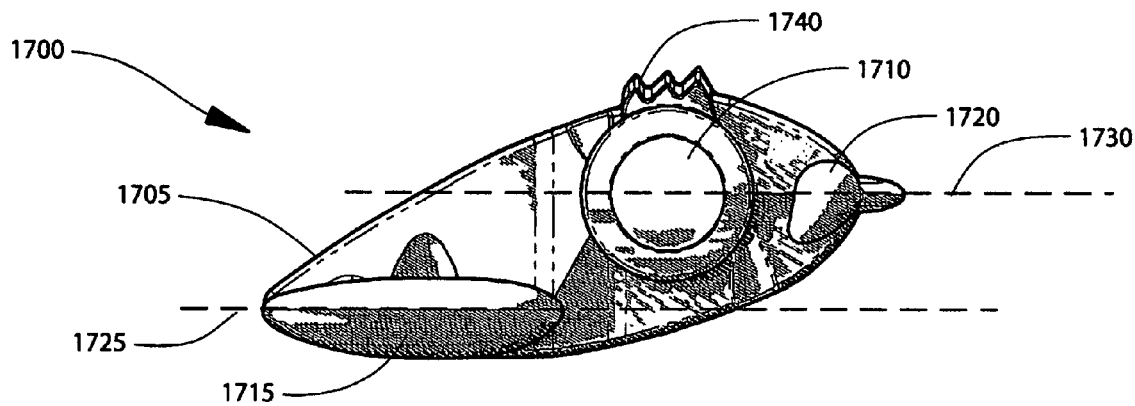
FIGS. 17-19 are top plan, side elevation, and bottom plan views, respectively, of an anchoring device according to yet another exemplary embodiment of the present invention.
Figure 18:
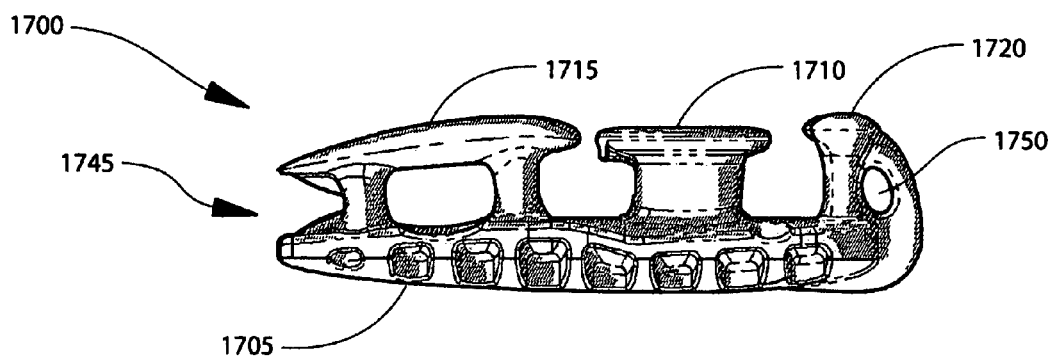
Figure 19:
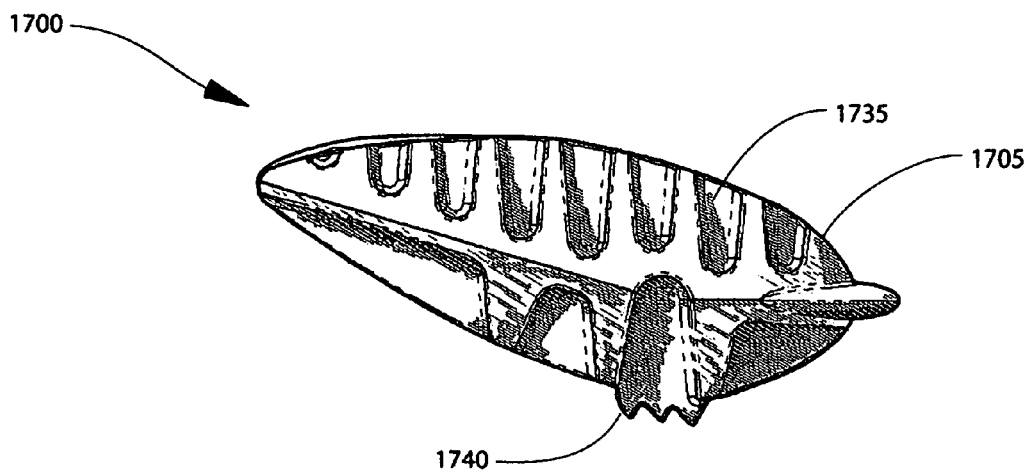

FIGS. 17-19 show top plan, side elevation, and bottom plan views, respectively, of an anchoring device 1700 according to another exemplary embodiment of the invention. The anchoring device 1700 comprising a base 1705 supporting a clam cleat 1710 and post 1720 that together define a clam cleat axis 1730, and a boat cleat 1715 with a longitudinal axis 1725. It will be appreciated that the longitudinal axis 1725, as used herein, is not a line drawn between the opposite noses 160 (FIG. 3) of the boat cleat 1715, but rather a projection of that line onto a plane defined by the base 1705, as shown in FIG. 17. Similarly, the clam cleat axis 1730 is drawn through the centers of the clam cleat 1710 and the post 1720 in the plane defined by the base 1705. In the embodiment of FIGS. 17-19 the clam cleat axis 1730 and the longitudinal axis 1725 are essentially parallel and offset from one another, though in other embodiments the axes 1715 and 1725 are not offset.

The anchoring device 1700 also includes a number of grooves 1735 defined into the base 1705. Such grooves 1735 can be useful for guiding a line in some configurations. Similarly, the anchoring device 1700 also includes a foot 1740 that projects laterally from the base 1705 proximate to the clam cleat 1710 and also provides one or more grooves for guiding the line in various configurations.

In some embodiments, the anchoring device 1700 also includes an eyelet 1750. As shown, the eyelet 1750 can be disposed on a side of the post 1720. An additional line passed through eyelet 1750 can be used as a ring to secure the anchoring device 1700 when not in use. With reference to FIG. 5, the additional line can also be tied around the ends of line 510 close to the anchoring device 100 for greater security.

It will be appreciated that the boat cleats of some anchoring device embodiments differ from traditional boat cleats in a number of ways. For example, the lengths of the noses 160 (FIG. 3) are shorter than in traditional boat cleats. Additionally, some boat cleats, such as boat cleat 1715, include a V-shaped groove 1745 in place of one of the recesses 165 (FIG. 3). It will be understood that when a smaller diameter line engages the boat cleat 1715, in a manner such as line 500 in FIG. 5, tension on the load-bearing side of the line pulls the line tightly into the V-shaped groove 1745 to prevent the line from slipping.

On the other hand, a larger diameter line may not be so effectively retained by the V-shaped groove 1745. To prevent the larger diameter line from slipping, when the loop of the line is fed through the aperture 170 (FIG. 3) the loop is given a half-twist so that the non-loaded side of the line passes through the V-shaped groove 1745. This configuration causes the load-bearing side of the line to cross over the non-loaded side of the line and to bind the non-loaded side of the line against the interior wall of the aperture 170. Accordingly, the aperture 170 is sized to prevent larger diameter lines from slipping while the V-shaped groove 1745 is provided to prevent smaller diameter lines from slipping.

The present invention also provides anchoing devices with four or mor cleats, comprising vaious combinations of both clam cleats and boat cleats, for special applications including building complex structures and systems.

In the foregoing specification, the invention is described with reference to specific embodiments thereof, but those skilled in the are will recognize that the invention is not limited thereto. Vaious features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A free-standing line anchoring device, comprising:
 a base having a top surface and first and second ends; a boat cleat extending from the first end of the base; and a clam cleat disposed on the top surface near the second end of the base; said boat cleat comprising an elongated shape with two opposing noses and narrowing under said opposing noses to a foot where said boat cleat attaches to the base, and an opening traversing the body of said boat cleat through which a loop from a first line can be fed and bent over the said noses to constrict and retain the body of said boat cleat as tension is applied to said first line; said claim cleat comprising a guiding recess for bending a second line through an angle between ninety and one hundred and eighty degrees, leading to a retaining feature comprising a v-shaped groove, with one or more guiding teeth disposed on the wall of the v-shaped groove, said teeth oriented with a slant to guide said second line towards the apex of the v-shaped groove.

2. The anchoring device of claim 1 further comprising a post disposed on the top surface proximate to the second end of the base.

3. The anchoring tensioning device of claim 2 wherein the post comprises a mushroom-shaped knob.

4. The anchoring tensioning device of claim 2 wherein a longitudinal axis of the boat cleat is parallel to, and offset from, a plane defined by the axes of the clam cleat and the post.

5. The anchoring tensioning device of claim 2 further comprising an eyelet disposed on the post.

6. The anchoring tensioning device of claim 1 further comprising a plurality of grooves defined into base.

7. The anchoring device of claim 1 wherein the boat cleat includes a V-shaped ridge longitudinally disposed in the recess under one or both noses of the boat cleat.

* * * * *